United States Patent

Ishimaru et al.

[11] Patent Number: 5,678,913
[45] Date of Patent: Oct. 21, 1997

[54] INDICATING INSTRUMENT

[75] Inventors: Tadaaki Ishimaru; Teruaki Araki, both of Kariya; Tsutomu Yoshikawa, Chita-gun, all of Japan

[73] Assignee: Nippondenso Co., Ltd., Kariya, Japan

[21] Appl. No.: 745,370

[22] Filed: Nov. 8, 1996

Related U.S. Application Data

[63] Continuation of Ser. No. 517,606, Aug. 22, 1995, abandoned.

[30] Foreign Application Priority Data

| | | | |
|---|---|---|---|
| Sep. 30, 1994 | [JP] | Japan | 6-237628 |
| Nov. 2, 1994 | [JP] | Japan | 6-270003 |
| Jan. 24, 1995 | [JP] | Japan | 7-009002 |
| Feb. 9, 1995 | [JP] | Japan | 7-021913 |
| Jul. 5, 1995 | [JP] | Japan | 7-169965 |

[51] Int. Cl.$^6$ ............................................. G01D 11/28
[52] U.S. Cl. ................................ 362/26; 362/29; 362/32
[58] Field of Search ................................ 362/23, 26, 29, 362/32; 116/284, 286, 287, 288

[56] References Cited

U.S. PATENT DOCUMENTS

| | | | |
|---|---|---|---|
| 5,078,079 | 1/1992 | Ohta et al. | 116/288 |
| 5,142,453 | 8/1992 | Ohta et al. | 362/29 |
| 5,319,527 | 6/1994 | Murphy et al. | |

FOREIGN PATENT DOCUMENTS

| | | |
|---|---|---|
| 0006361 | 1/1980 | European Pat. Off. . |
| 411799 | 2/1991 | European Pat. Off. . |
| 3837295 | 5/1990 | Germany . |
| 64-10625 | 1/1989 | Japan . |
| 2-49592 | 12/1990 | Japan . |

*Primary Examiner*—Alfred Basichas
*Attorney, Agent, or Firm*—Cushman, Darby & Cushman IP Group of Pillsbury Madison & Sutro LLP

[57] ABSTRACT

An indicator for use in a vehicle instrument panel has a light conductive pointer illuminated by a light emitting diode or LED. In order to provide an increased illuminating surface of the pointer, a slit is formed on a cap to extend from the outer periphery of the cap to a portion above a center of rotation of the pointer driven by a driving shaft. A fixture is connected to the driving shaft and holds a light receiving portion of the pointer at the portion above the center of rotation and the LED in the optical alignment with the pointer at a portion off an axis of the center of rotation. A balancing weight is disposed at a portion opposite the LED with respect to the driving shaft in order to keep balance of the indicator.

34 Claims, 15 Drawing Sheets

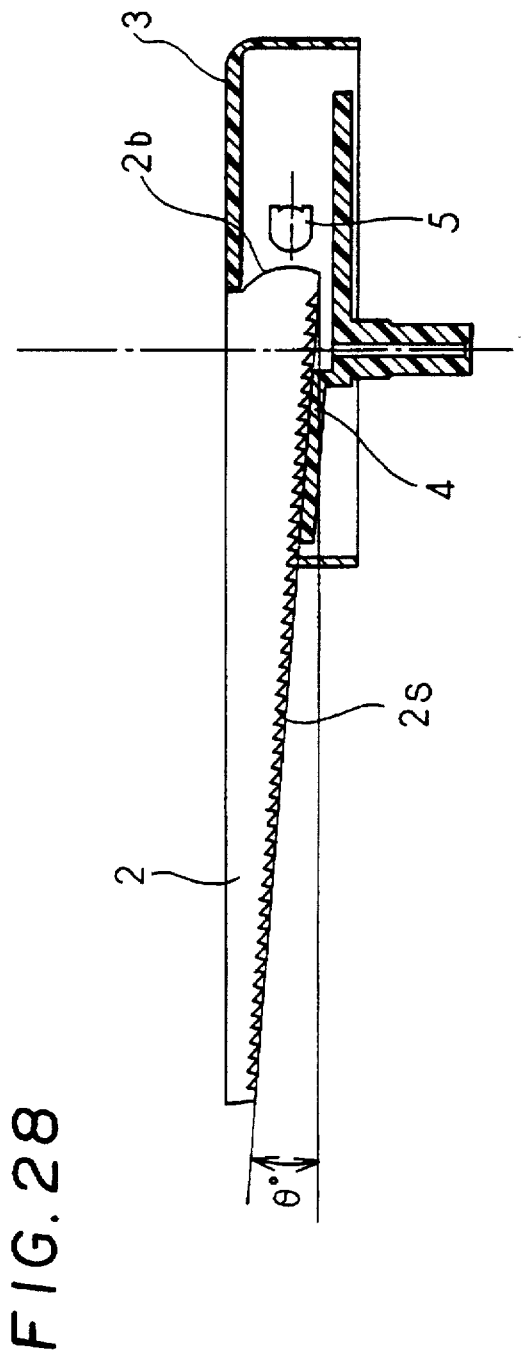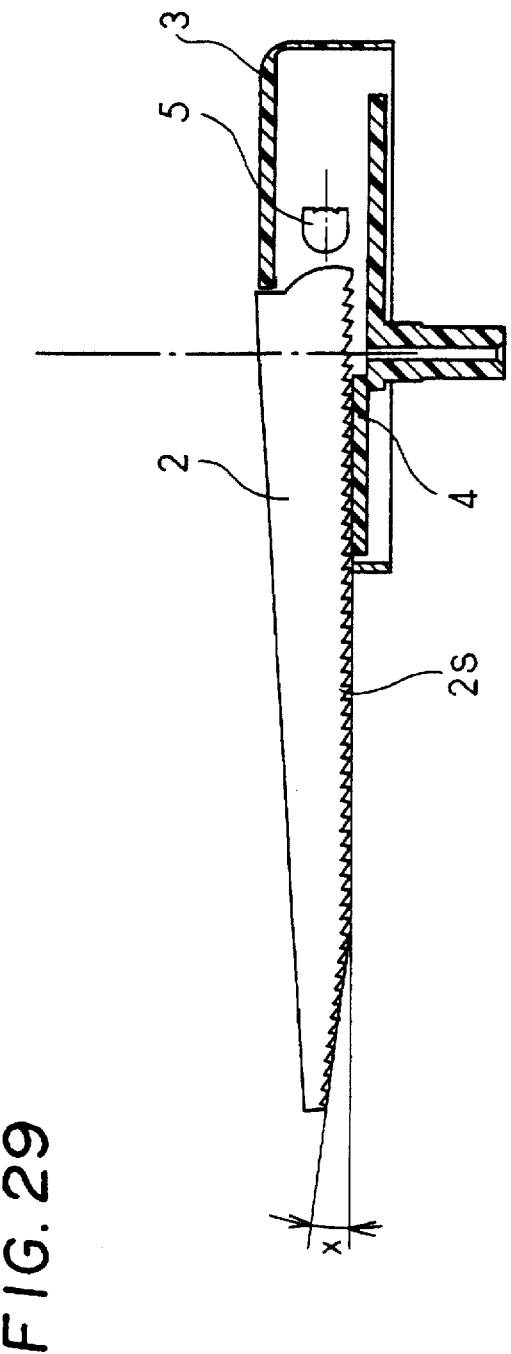

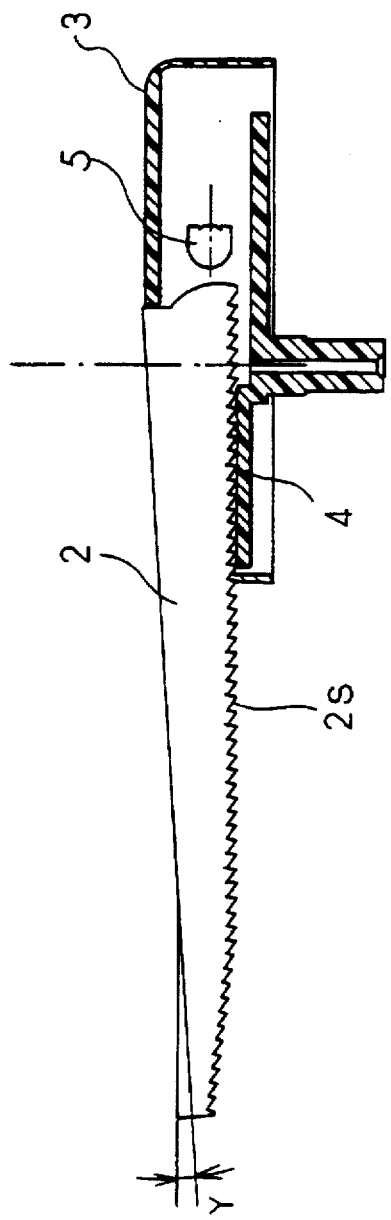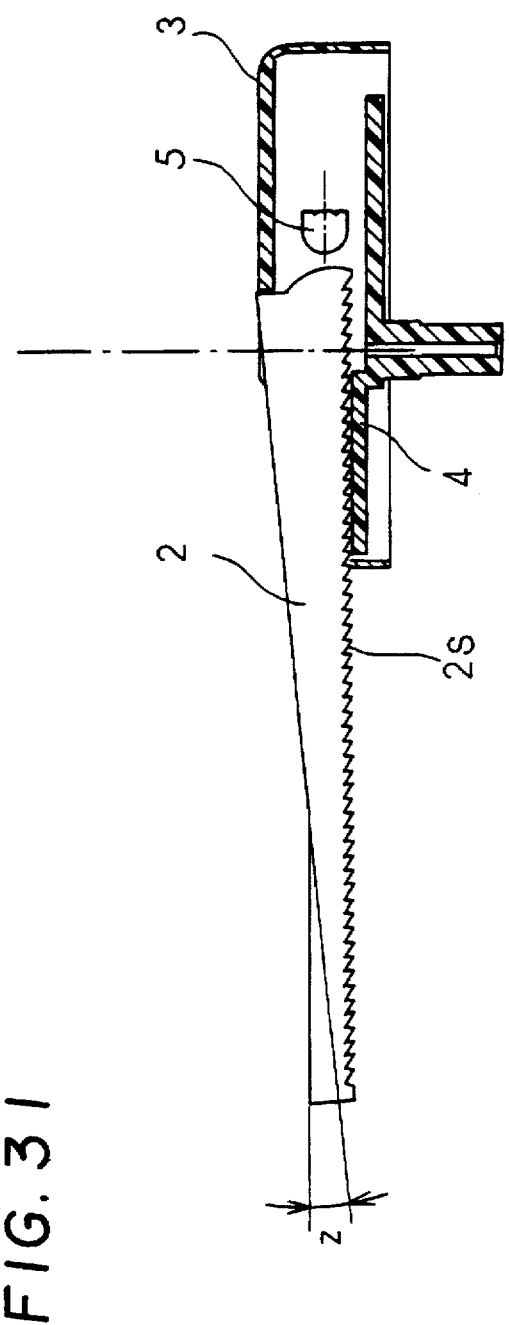

INDICATING INSTRUMENT

CROSS REFERENCE TO RELATED APPLICATION

This is a continuation of application Ser. No. 08/517,606, filed on Aug. 22, 1995, which was abandoned upon the filing hereof.

The present application is based on and claims priority from Japanese Patent Applications Hei 6-237628 filed on Sep. 30, 1994, Hei 6-270003 filed on Nov. 2, 1994, Hei 07-9002 filed on Jan. 24, 1995, Hei 7-21913 filed on Feb. 9, 1995 and Hei 7-169965, filed on Jul. 5, 1995.

BACKGROUND OF THE INVENTION

1. Field of the Invention

The present invention relates to an indicating instrument for an automobile which has a light conductive pointer illuminated by a built-in light emitting element.

2. Description of the Related Art

U.S. Pat. No. 5,142,453, which corresponds to Japanese Utility Model Unexamined publication Hei 3-63821, discloses an indicator in which a light emitting element is disposed at an end of a pointer driving shaft. A light receiving portion of the pointer is carried by a fixture which is driven by the driving shaft.

However, since the light emitting element is disposed at a center of rotation of the fixture, an illuminating portion of the pointer is limited and the pointer is not sufficiently visible in the dark.

Japanese Utility Model Unexamined Publication Sho 64-10625 discloses an indicator which has an LED disposed outside the indicator and a pointer which has a toothed bottom surface. The toothed surface reflects light upward from its internal inclined surfaces and increases the luminance of the pointer upper surface which is the illuminating surface.

However, if light enters the pointer from upper outside thereof when the LED which is not energized, the pointer is illuminated by the light from the outside since it is reflected from the toothed surface and illuminates the pointer in the same manner as mentioned above.

SUMMARY OF THE INVENTION

The present invention is made in view of the foregoing problems, and has a primary object of providing an improved indicating instrument having an illuminating pointer which has excellent visibility.

Another object of the present invention is to provide an indicating instrument having an improved pointer which has a sufficient illumination surface of high luminance.

A further object of the present invention is to provide an indicating instrument which has a casing with a center of rotation connected to a driving shaft and a slit not only to hold the pointer abut also to expose the illuminating surface of the pointer to a driver. The casing secures a light receiving portion of the pointer above the center of rotation and an LED in optical alignment to the light receiving portion. Since the pointer is secured at a portion above the driving shaft and the illuminating surface of the pointer is exposed to the outside, the entire illuminating surface of the pointer can be made long and visibility is increased.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 28 is a cross-sectional view illustrating an indicator according to an eighth embodiment of the present invention;

FIG. 29 is a cross-sectional view illustrating an indicator according to an ninth embodiment of the present invention;

FIG. 30 is a cross-sectional view illustrating an indicator according to a tenth embodiment of the present invention;

FIG. 31 is a cross-sectional view illustrating an indicator according to an eleventh embodiment of the present invention.

DETAILED DESCRIPTION OF THE PREFERRED EMBODIMENT

Preferred embodiments will be described with reference to appended drawings hereafter.

Figure 11:
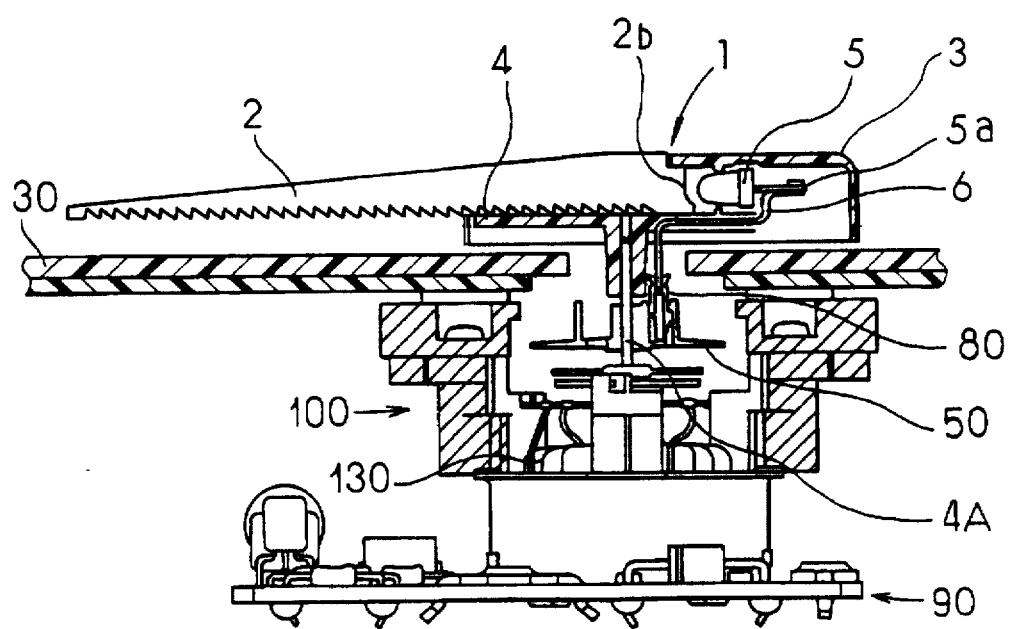
FIG. 11 is a cross-sectional side view illustrating overall structure of an indicating instrument.
Figure 12:
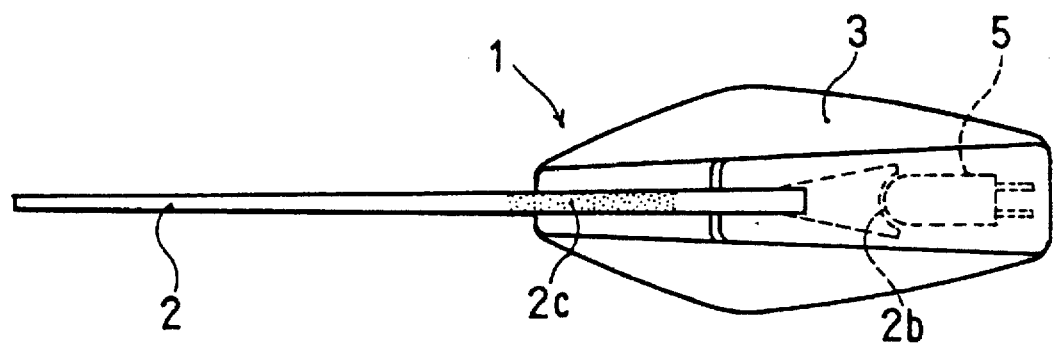
FIG. 12 is a plan view illustrating an indicator according to a third embodiment of the present invention.
Figure 13:
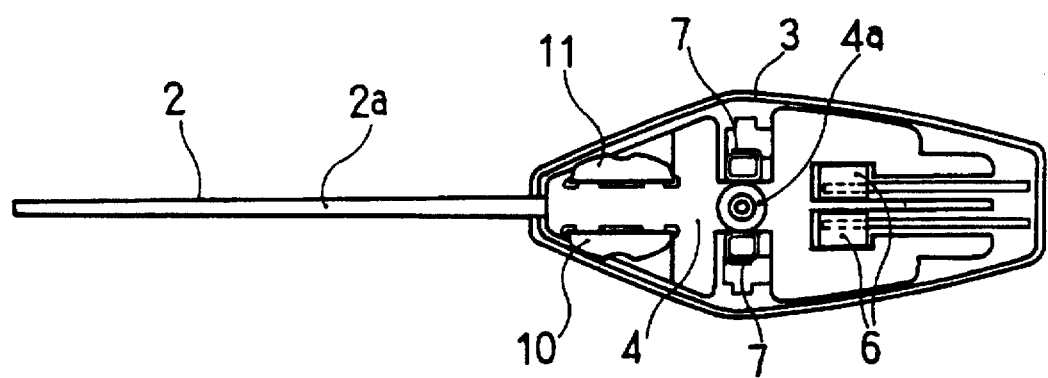
FIG. 13 is a bottom view illustrating the indicator according to the third embodiment.

An overall structure of an indicating instrument which has an illuminating pointer is illustrated in FIG. 11. An indicator 1 has a pointer 2 which is secured between a cover 3 and a fixture 4. The fixture 4 is carried rotatably by an driving shaft 4A to drive the pointer 2 on a dial plate 30. The pointer has a bottom surface formed in parallel with an optical axis as described in detail later and an upper surface tapering toward its pointed end. An LED or light emitting diode 5 is disposed at an end portion of the pointer 2 adjacent to the indicator driving shaft 4A (opposite the tip). Light emitted by the LED 5 enters the pointer 2 at a light receiving surface 2b thereof and illuminates the entire portion of the pointer 2. Electric leads 5a of the LED are connected by fusion bonding or else to an electric connector member 6 which is connected to a terminal 80 disposed in an insulating member 50 which is fixed around the driving shaft 4A. The fixture 4, the LED 5 and the leads 5a are enclosed in the cover 3. A terminal 80 is connected to an electric source (not shown) and supplies electric power to the LED 5. The insulating member 50 and a cross-coil 130 which drives the driving shaft 4A are disposed in an internal unit 100, which is secured to a printed circuit board 90. The printed circuit board 90 includes components and parts for controlling power supply of the cross-coil 130.

The structure of the indicator 1 is described with reference to FIG. 1 through FIG. 4. The indicator 1 has a pointer 2, cover 3, a fixture 4 and a light emitting element such as an LED which emits red or orange colored light. A light receiving portion of the pointer 2 is fixed between the cover 3 and the fixture 4 at its base end as shown in FIG. 4. The pointer 2 may be molded integrally with the cover 3 or the fixture 4. The pointer 2 is made of light-conductive synthetic resin such as acrylic resin or polycarbonate and has a colored layer formed on a bottom surface thereof by hot stamping or the like. The colored layer may be formed of a colored thin plate made of light-conductive material. The light receiving portion of the pointer 2 has a wide surface facing a spherical surface of the LED 5 so that it can receive the light emitted from the LED effectively. The cover 3 is made of black synthetic resinous material such as ABS or the like and is formed into an elliptic cap-shape which has a slit 3s for receiving the pointer 2 therein. The cover 3 has ribs 3a, 3b and 3c at the inside surface which are formed into an arc so as to support an outer periphery of the LED and fix it in position as shown in FIG. 5.

Figure 5:
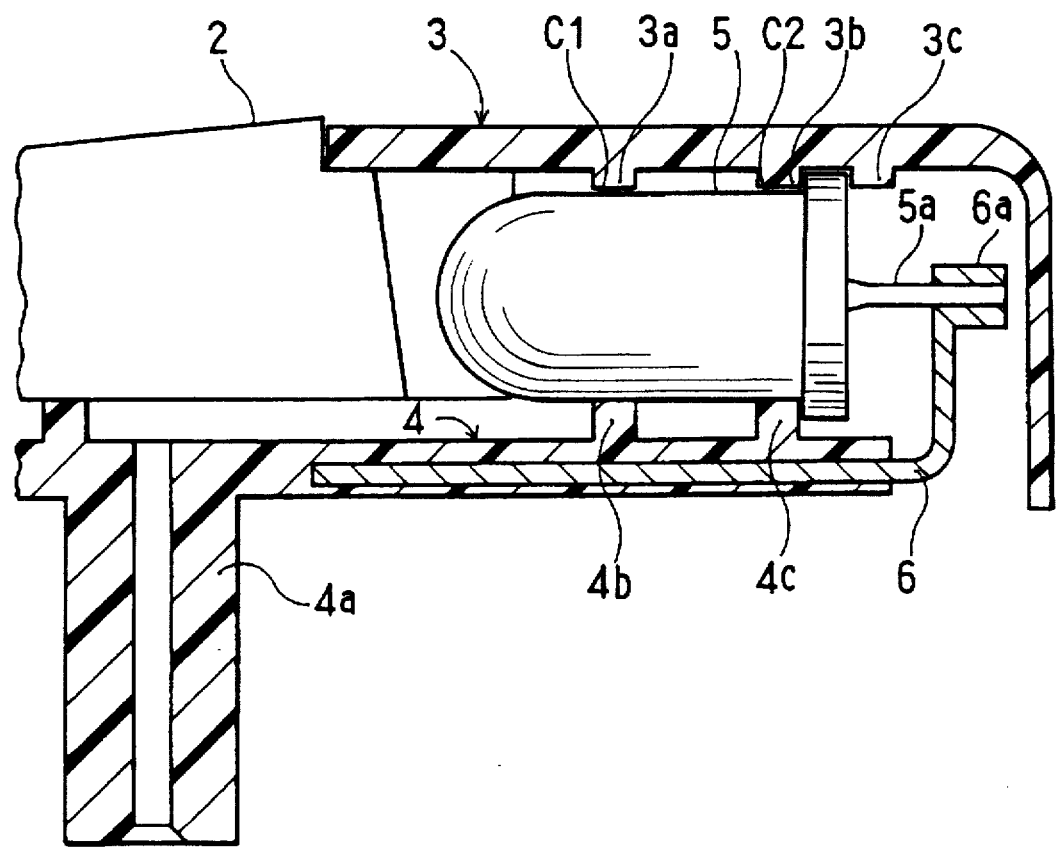
FIG. 5 is an enlarged cross-sectional view of a main portion of the indicator illustrated in FIG. 4.
Figure 6:
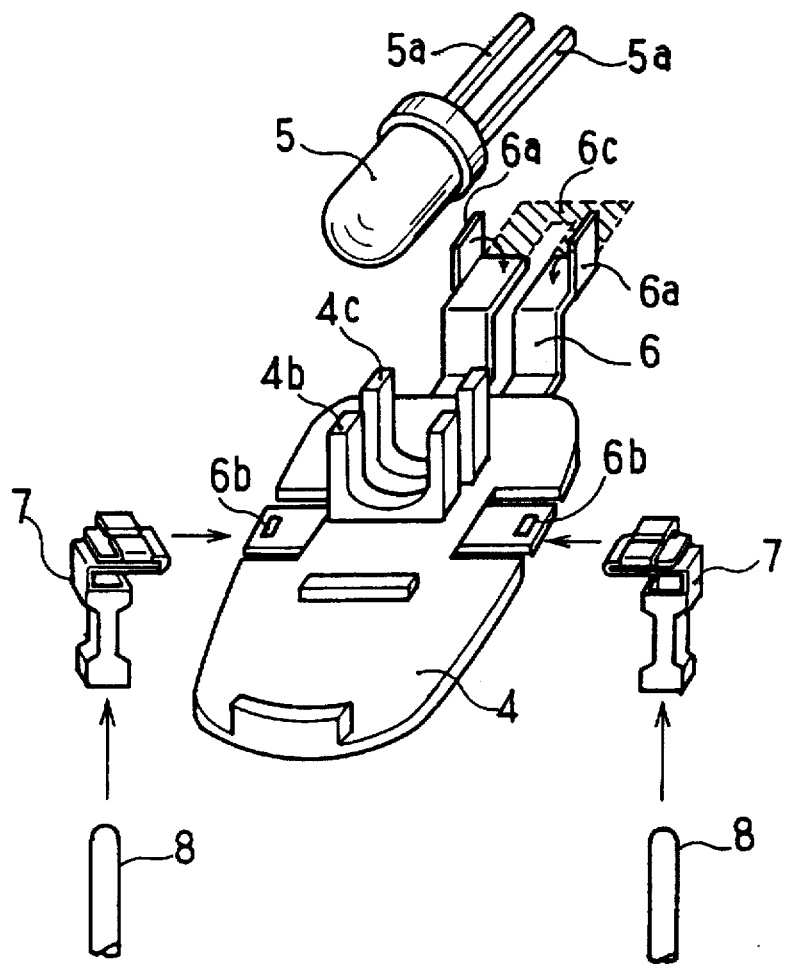
FIG. 6 is an exploded view of the indicator according to the first embodiment.

The fixture 4 is also made of the same material as the cover 3 and has a plate and a boss 4a formed under the plate to carry the driving shaft 4A (FIG. 10) as shown in FIG. 5 and FIG. 6. The fixture 4 has ribs 4b and 4c formed into U-shape to hold LED 5 in position and a connector member 6 molded integrally with the fixture 4.

The connector member 6 is made of a phosphor bronze plate and has a pair of terminals connecting to a pair of leads 5a of the LED 5 respectively. Upright members 6a are formed on an end of the connector member 6 and bent to hold the leads 5a when connected. The connector member 6 has a pair of tongue-shape terminal plates 6b at the opposite end of the connector member 6 which are disposed on both sides of the fixture 4. Terminal pieces 7 are fitted to the terminal plates 6b respectively. The terminal pieces 7 have spring plates which hold the terminal plates 6b therebetween and catches which hold connecting pins 8 respectively. A bridge portion 6c is formed to protect the terminals of the connector member 6 when it is molded. The bridge portion 6c is removed thereafter. This structure is effective to reduce the production work.

When the LED 5 is fixed to the fixture 4, the LED 5 is placed on the ribs 4b and 4c so that both leads 5a are placed on the terminals of the connector member 6. Then, the upright members 6b are bent to fix the leads 5a. Thus, since the leads 5a is fixed to the connector member 6 without bending, little damage is caused to the LED 5.

The light receiving portion of the pointer 2 which is inserted between the cover 3 and the fixture 4 is fixed by means of fusion or adhesive bonding. At the same time, the LED 5 is fixed between the cover 3 and the fixture.

The light receiving portion of the pointer 2 is disposed at the back of the fixture from where the boss 4a extends to the opposite direction as shown in FIG. 5. In other words, the light receiving portion is disposed at the center of rotation of the fixture or the pointer. The LED 5 is disposed at a portion of the cover 3 off to the boss 4a or the center of rotation to face the light receiving portion of the pointer 2. The slit 3s is formed to extend from a peripheral portion of the cover 3 to a portion right above the center of the rotation so that the illumination of entire portion of the pointer 2 can be seen by a driver. When such pointer 2 is disposed on a black face panel in an instrument and illuminated by the LED 5, the pointer 2 looks prominently as if it were floating on the panel. The connector member 6 has a conductive plate in parallel with the LED which is longer than a longitudinal portion of the LED so that the connector member 6 can be connected to a conductor retained in the insulating member 50 which is disposed around the driving shaft 4A. As a result, the connector member 6 can he disposed along the fixture 4 without providing an extra opening in the dial plate 30 as shown in FIG. 11.

Figure 7:
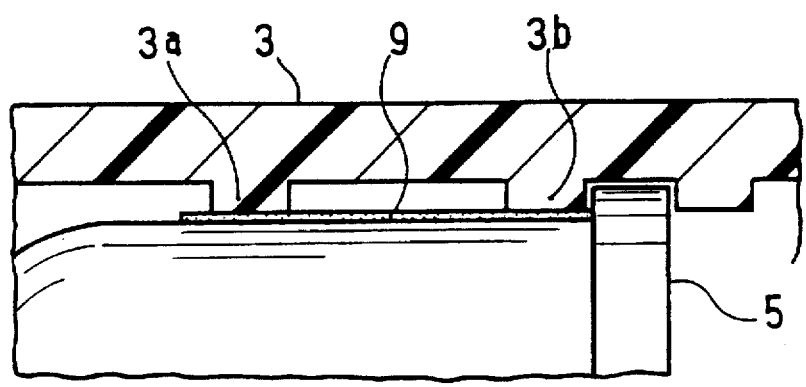
FIG. 7 is an enlarged cross-sectional view of a main part of the indicator according to the first embodiment.

The LED 5 is placed on the ribs 3a, 3b and 3c with small clearances C1 and C2 so that they allow the thermal expansion of the body of the LED when it is heated, thereby preventing disconnection of metal wires in the LED due to thermal stress. As a cushion member, a thin sheet of polyurethan foam 9 may be inserted in the clearances as shown in FIG. 7 for the above purpose. The sheet can prevent vibration of the LED 5 and noise caused by the vibration.

Figure 1:
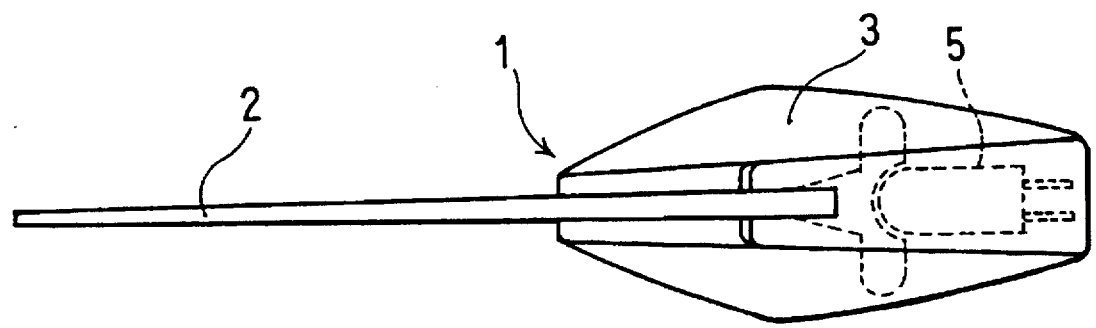
FIG. 1 is a plan view illustrating an indicator according to a first embodiment of the present invention.
Figure 2:
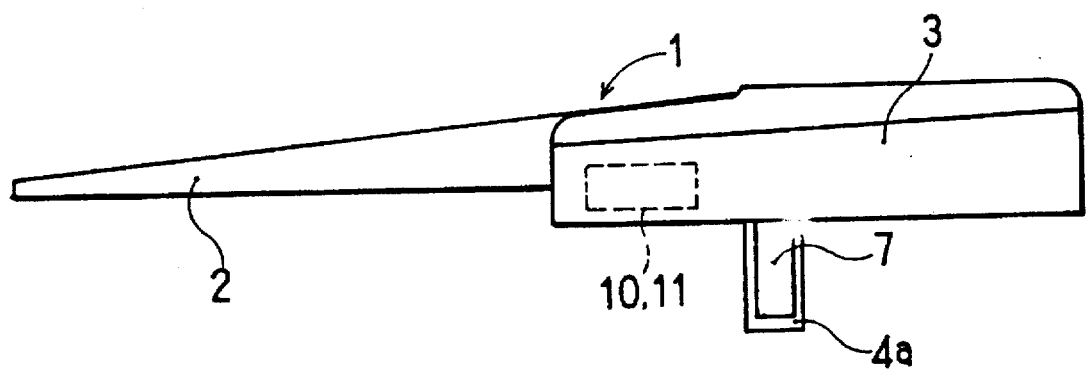
FIG. 2 is a front view of the indicator illustrated in FIG. 1.
Figure 3:
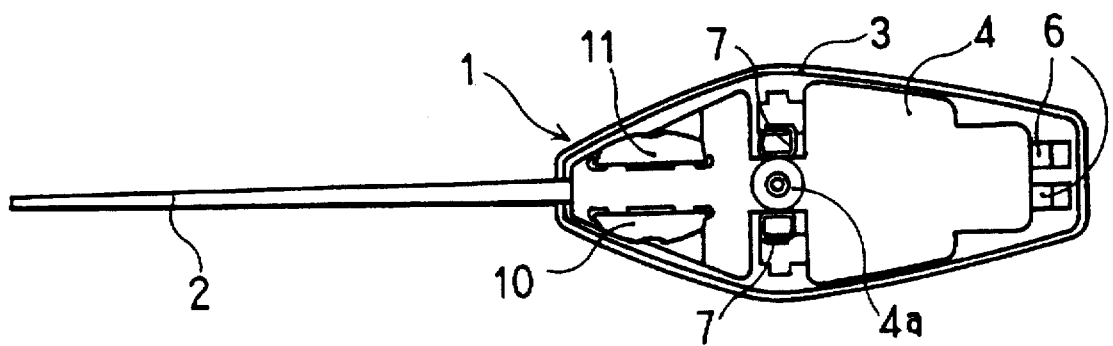
FIG. 3 is a bottom view of the indicator illustrated in FIG. 1.
Figure 4:
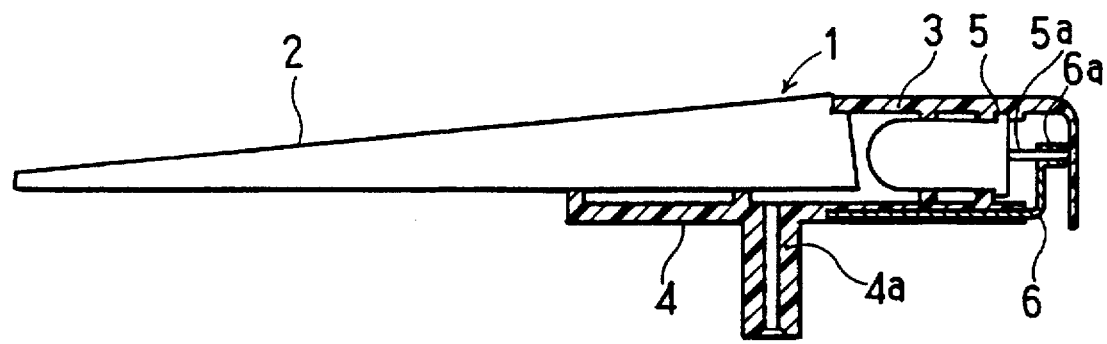
FIG. 4 is a cross-sectional view of the indicator according to the first embodiment.

A couple of balancing weights 10 and 11 are disposed at a portion of the fixture opposite the LED with respect to the center of rotation and on both sides of the pointer 2 as shown in FIG. 3 so that the indicator 1 can turn on the dial plate 30 smoothly.

When assembled, the indicator 1 is fixed to the driving shaft 4A by the boss 4a and connecting pins 8 are inserted into the terminal pieces 7. The LED 5 is energized through hair springs (not shown), the connecting pins 8, the terminal pieces 7 and the connector member 6. When the LED 5 is energized and emits light, the light enters the light receiving portion of the pointer 2 and the entire portion of the pointer is illuminated.

Other embodiments according to the present invention will be described with reference to other figures hereafter.

The same reference numerals used in the figures indicate the same or equivalent members or portions disclosed in the first embodiment. Therefore, only portions, parts or operations which are not the same or equivalent are described hereafter.

Figure 8:
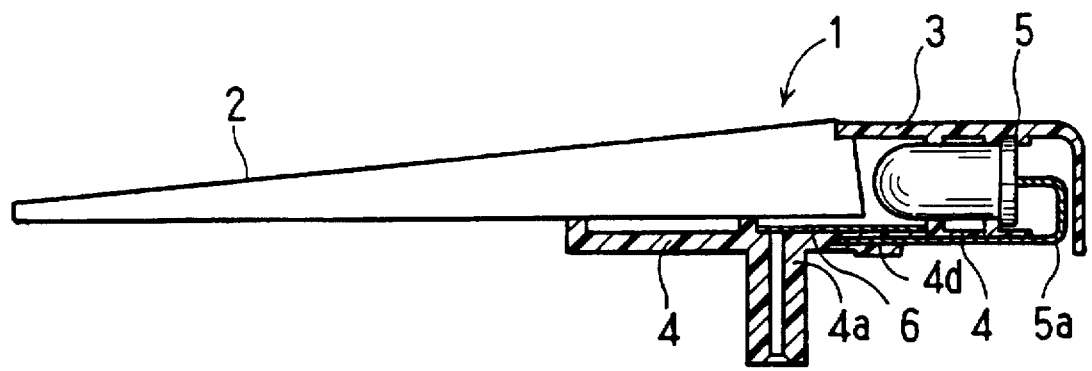
FIG. 8 is a front view illustrating an indicator according to a second embodiment.
Figure 9:
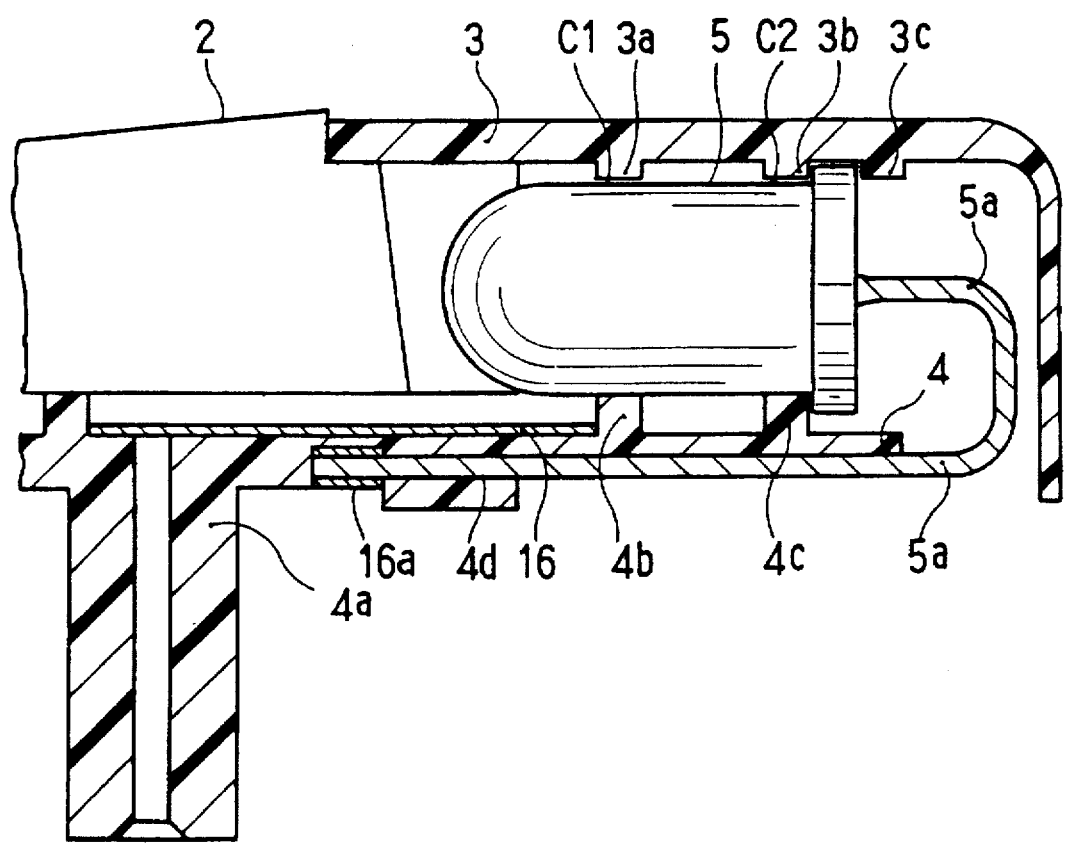
FIG. 9 is an enlarged cross-sectional view of a main portion of the indicator illustrated in FIG. 8.
Figure 10:
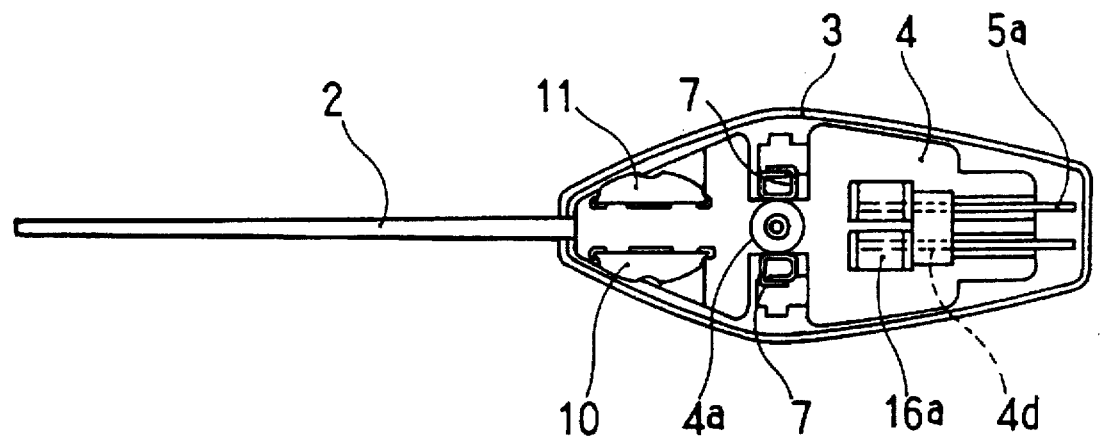
FIG. 10 is a bottom view illustrating the indicator according to the second embodiment.

A second embodiment is described with reference to FIG. 8 through FIG. 10.

In this embodiment, a separate connector member 16 is disposed along the plate portion of the fixture 4. The leads 5a of the LED 5 is bent and extended through a supporting hole 4d formed in the fixture 4 to a connector terminal 16a which is a portion of the connecter member 16 and connected to the terminal piece 7 shown in FIG. 10. The lead 5a is connected to the connector terminal 16a in the same manner as the connector member 6 described with reference to FIG. 6.

A third embodiment is described with reference to FIG. 2 through FIG. 14 next.

Figure 14:
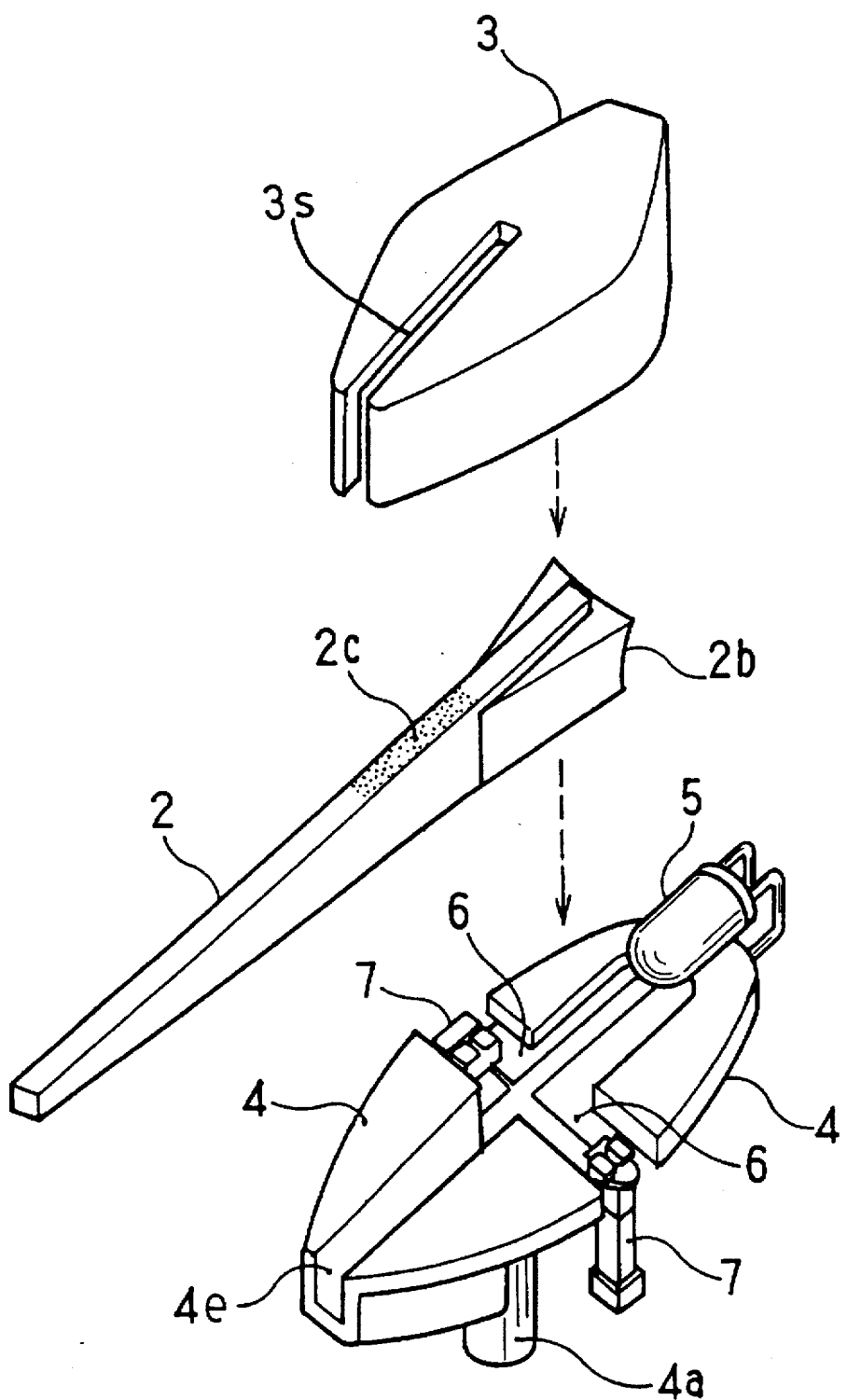
FIG. 14 is an exploded view of the indicator according to the third embodiment of the present invention.

The pointer 2 of this embodiment has a hemispheric concave surface 2b at the light receiving portion to receive the light emitted by the LED 5, a colored layer 2a formed of a resinous plate such as acrylic resin, policarbonate or the like on a bottom surface and a matted or frosted portion 2c formed by hot stamping or else on an upper surface thereof. The concave surface 2b corresponds to a hemispheric surface of the light emitting portion of the LED so that it can receive the light effectively. The fixture 4 in this embodiment has a longitudinal groove 4e for receiving the pointer 2 as shown in FIG. 14. The leads of the LED 5 are bent downward and connected to the connector member 6 in the same manner as the previous embodiments.

When the LED is energized, the light enters at the concave surface 2b of the pointer 2 and is scattered by the colored layer 2a, thereby illuminating an entire portion of the pointer 2 with a visible colored light uniformly. Since the light enters at the hemispheric concave surface 2b of the pointer 2, the light goes straight through the inside of pointer and does not converge on an upper central portion thereof. The concave surface 2a can be replaced by a cylindrical surface.

Figure 15:
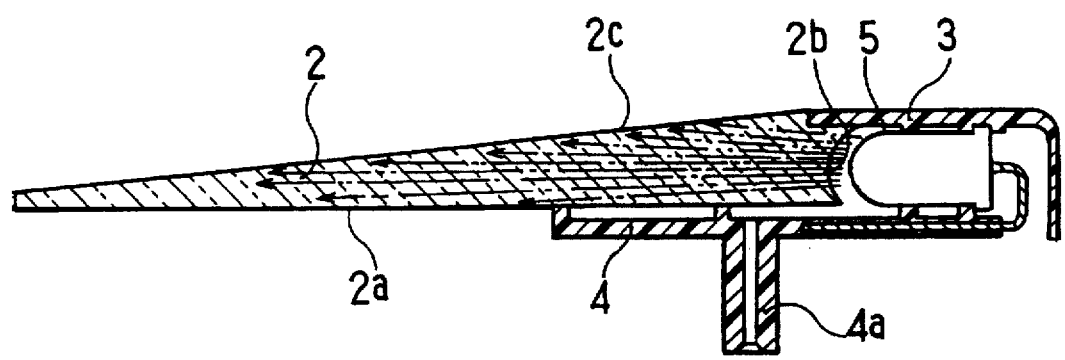
FIG. 15 is a cross-sectional view illustrating the indicator according to the third embodiment.

When the pointer 2 is tapered off to its pointed end and the light converges on an upper central portion where the matted portion 2c is located as shown in FIG. 15, the light is scattered by the matted portion 2c so that uniform illumination can be provided.

A matted portion can be located at an upper surface of the light receiving portion close to the concave surface 2b to scatter the light going upward, thereby preventing the convergence of the light.

Figure 16:
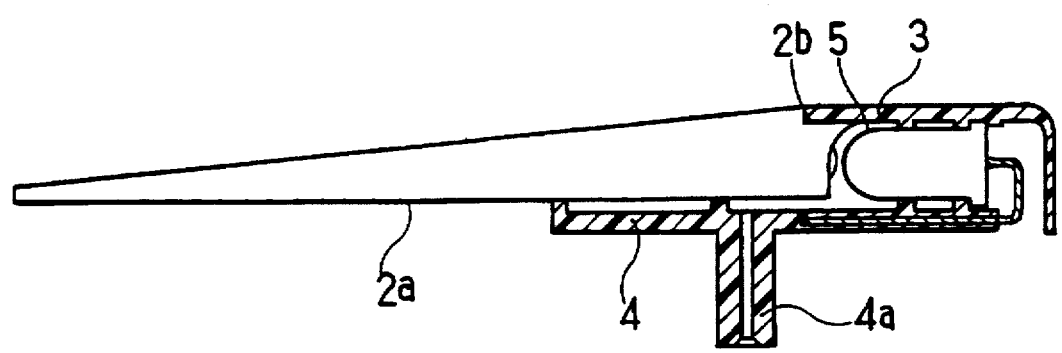
FIG. 16 is a cross-sectional view illustrating an indicator according to a fourth embodiment of the present invention.

A fourth embodiment is illustrated in FIG. 16. Only an upper surface of the light receiving portion of the pointer 2 is concave and vertically cylindrical in this embodiment and similar effect is also ensured in this embodiment.

Figure 17:
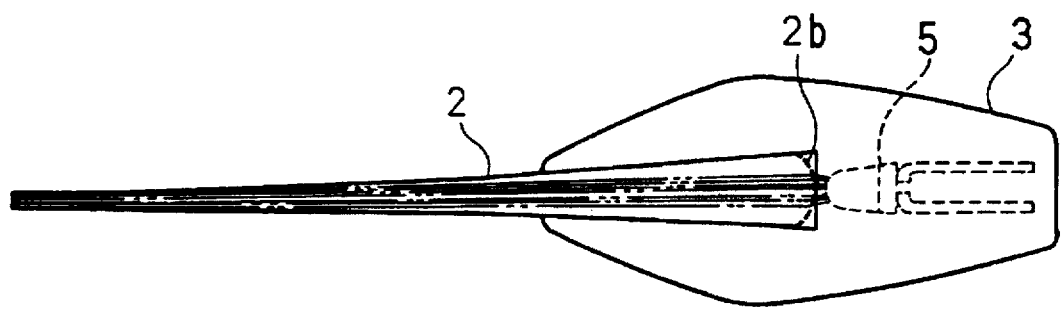
FIG. 17 is a schematic plan view illustrating an indicator according a fifth embodiment of the present invention.
Figure 18:
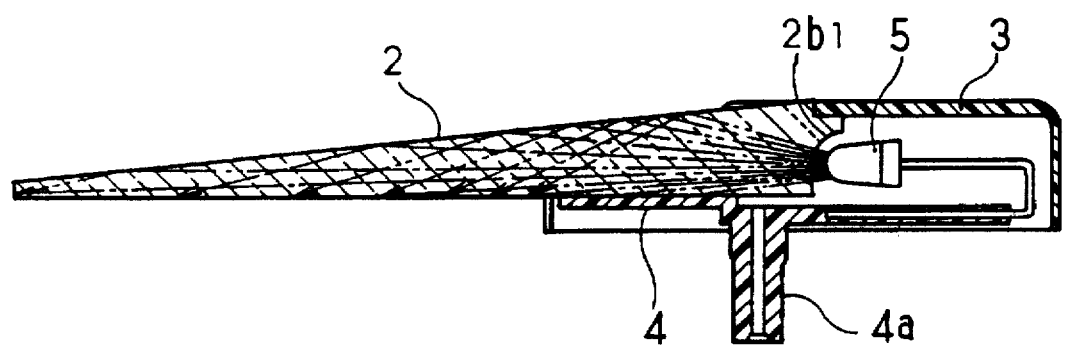
FIG. 18 is a cross-sectional view of the indicator illustrated in FIG. 17.
Figure 19:
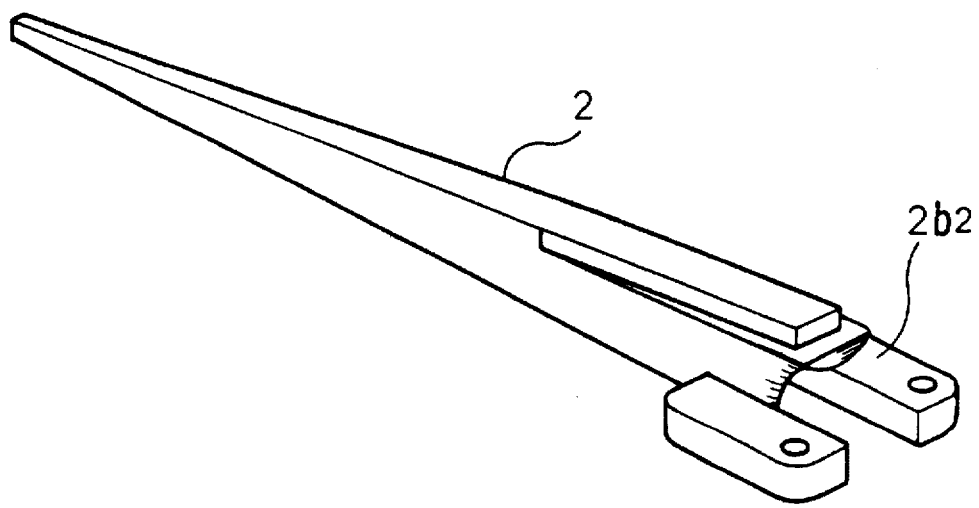
FIG. 19 is a perspective view illustrating a pointer of the indicator according to the fifth embodiment.
Figure 20:
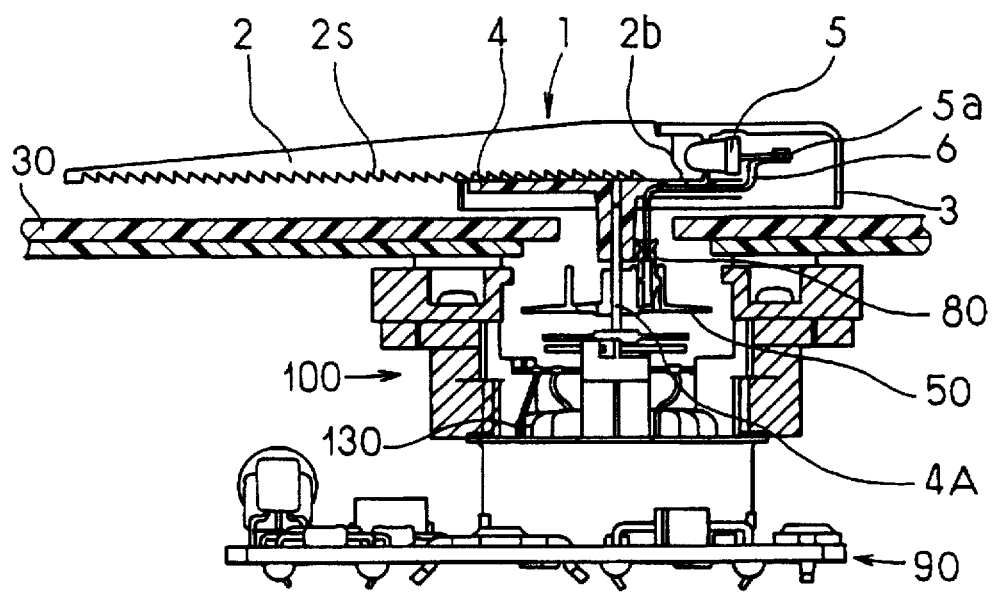
FIG. 20 is a cross-sectional side view illustrating overall structure of an indicating instrument according to a sixth embodiment of the present invention.

A fifth embodiment is illustrated in FIG. 17 through FIG. 19. The pointer 2 has an inclined upper surface relative to a horizontal bottom surface and the light receiving portion which has a horizontal convex surface 2b2 at an upper portion thereof as illustrated in FIG. 19 and vertical concave surface 2b1 at an upper portion thereof as illustrated in FIG. 18, in order to receive the light emitted by the LED 5 more effectively.

When the light emitted by the LED 5 enters at an upper surfaces of the light receiving portion of the pointer 2, the light becomes parallel and goes along the pointer 2 to the pointed end thereof without reflection by the wail.

A sixth embodiment is described with reference to FIG. 20 through FIG. 23.

Figure 21:
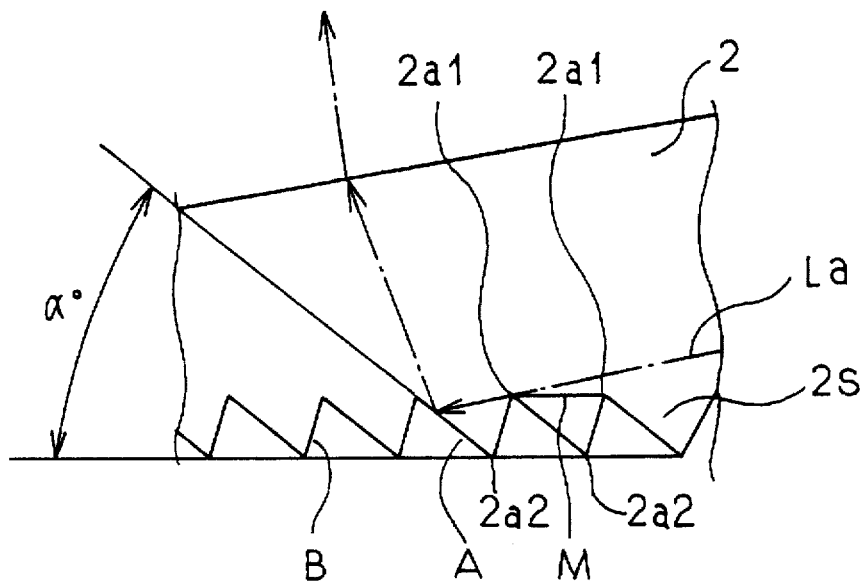
FIG. 21 is a schematic view of a part of a pointer of the indicator according to the sixth embodiment.

The pointer 2 has a convex surface 2b at the light receiving portion and a toothed surface 2s at its bottom. The toothed surface 2s includes teeth having reflecting surfaces A and B as shown in FIG. 21. The surfaces A face the LED 5 and the surfaces B face the pointed end of the pointer 2. When a triangle which is composed of a line M connecting two adjacent bottom portions 2a1 of the teeth and adjacent lines on a cross-section of the reflecting surfaces A and B meeting at a vertex 2a2 is assumed, the vertex 2a2 leans more to the LED 5 than to the pointed end of the pointer 2. In other words, an angle $\alpha$ formed between the bottom surface of the pointer 2 and one of the reflecting surfaces A is smaller than an angle $\beta$ formed between the bottom surface and one of the reflecting surfaces B as shown in FIG. 22.

When the light emitted by the LED 5 enters at the concave surface 2b of the pointer 2, a part of the light is reflected from an upper wall of the pointer 2 and scattered, and another part of the light goes along the pointer to its pointed end. Another part of the light La emitted into the pointer 2 goes to the toothed surface 2s as shown in FIG. 21. The incident angle of the light La becomes greater than the critical angle of the reflecting surface A and, consequently, it is totally reflected upward and illuminates the upper side of the pointer. Since the light La going downward may be utilized to illuminate the pointer 2, the luminance of the pointer increases.

When the LED 5 is not energized, light comes from the outside and enters the pointer 2.

Figure 22:
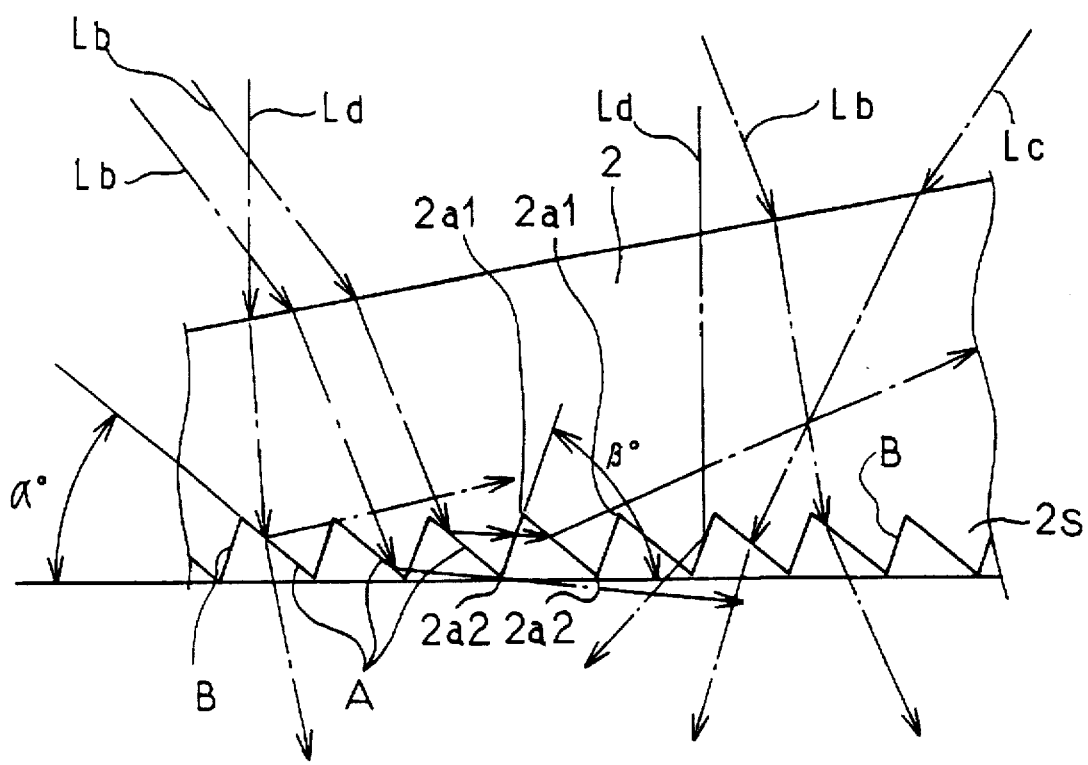
FIG. 22 is a schematic view of a part of a pointer of the indicator according to the sixth embodiment.
Figure 23:
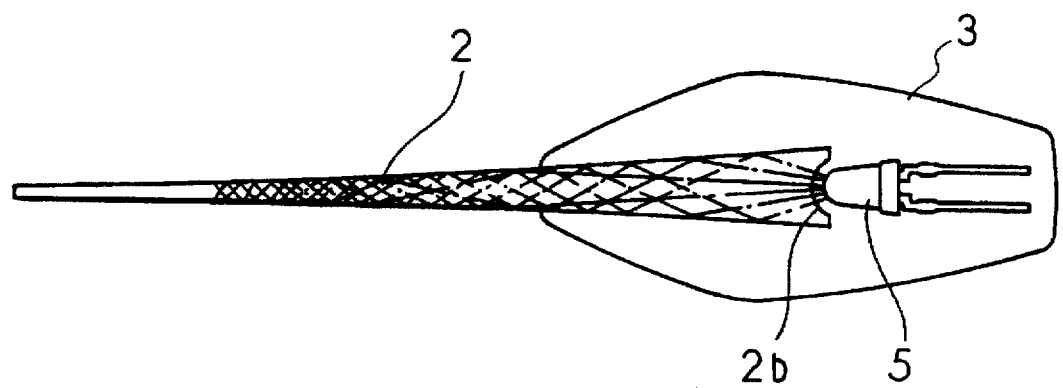
FIG. 23 is a schematic plan view illustrating the indicator according to the sixth embodiment.

When light Ld above the pointer enters the pointer 2 vertically to the bottom surface thereof and comes to the reflecting surface A as shown in FIG. 22, the light Ld goes through the bottom surface of the pointer 2 since the incident angle is smaller than the critical angle. If the light Ld is partly reflected from the surface A, it may go toward the concave portion 2a or go along the pointer 2 and go out. When the light Ld comes to the reflecting surface B, it is totally reflected and goes toward the pointed end and does not come into a driver's view. Thus, the light Ld does not illuminate the pointer 2 as the LED 5 does.

When light Lb enters the pointer 2 from an upper front side thereof and comes to the reflecting surfaces A and B with the incident angle being smaller than the critical angle, the light passes through the bottom surface of the pointer 2 and does not illuminate the pointer 2. On the other hand, when the light Lb comes to the toothed surface 2s with the incident angle being greater than the critical angle, the light is reflected from the toothed surface 2s and goes to the curved surface 2b, and therefore the light Lb does not come into the driver's view.

When light Lc enters the pointer 2 from an upper rear side of the pointer 2 and comes to the toothed surface 2s, it passes therethrough since the incident angle is smaller than the critical angle.

A seventh embodiment is described with reference to FIG. 24 through FIG. 27.

In this embodiment, every triangle formed on a cross-section of the toothed surface 2s, which is described in the fifth embodiment, has a right angle $\beta$ between the reflecting surface B and the bottom line (horizontal line, cf. FIG. 22). In other words, every triangle of the toothed surface is a right triangle.

Light emitted from the LED 5 goes to the toothed surface, where it is reflected from the surface A upward and goes out from an upper surface of the pointer 2 as described in the fifth embodiment.

When the light is not emitted by the LED 5, light comes from the outside and enters the pointer 2.

Figure 25:
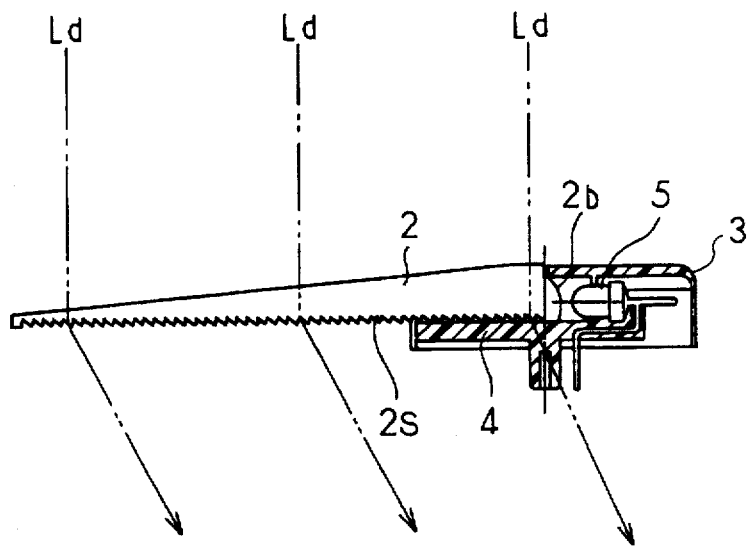
FIG. 25 is a cross-sectional side view illustrating the indicator according to the seventh embodiment.

Light Ld which enters the pointer 2 vertically to the bottom surface thereof from above the pointer and comes to the reflecting surface A as shown in FIG. 25 passes through the bottom surface of the pointer 2 since the incident angle is smaller than the critical angle.

Figure 26:
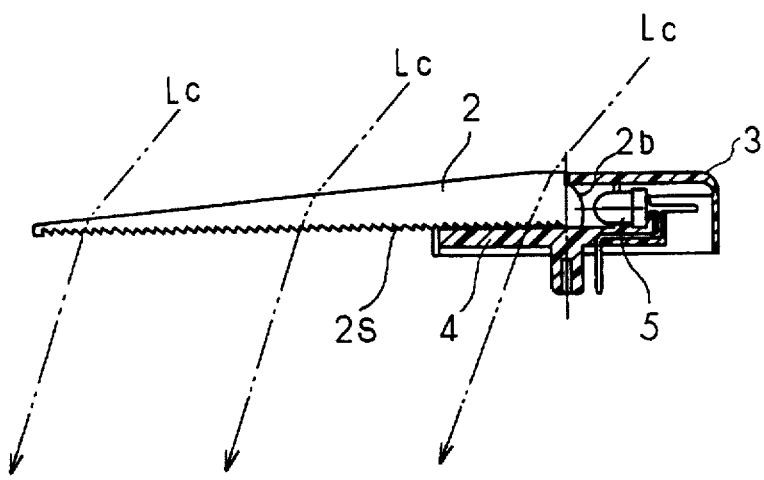
FIG. 26 is a cross-sectional side view illustrating the indicator according to the seventh embodiment.

When light Lc enters the pointer 2 from an upper rear side of the pointer 2 and comes to the toothed surface 2s as shown in FIG. 26, it passes therethrough since the incident angle is smaller than the critical angle.

Figure 27:
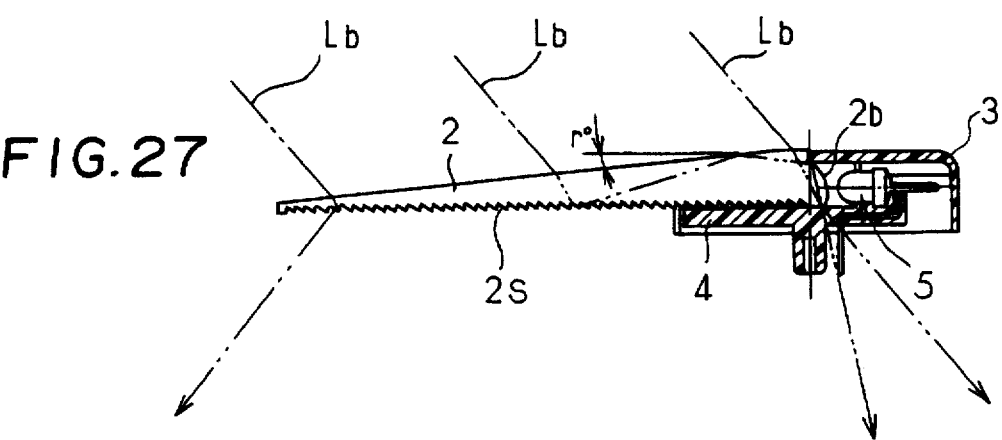
FIG. 27 is a cross-sectional side view illustrating the indicator according to the seventh embodiment.

Light Lb which enters the pointer 2 from an upper front side thereof as shown in FIG. 27 comes mostly to the reflecting surface B with the incident angle being greater than the critical angle and is totally reflected from the toothed surface 2s and directs to the curved surface 2b through the reflecting surface A since the incident angle is smaller than the critical angle, and therefore the light Lb does not come into the driver's view. Light Lb which comes to the reflecting surfaces A is totally reflected and directs upward. However, it is totally reflected from the upper wall again since the upper wall has an inclination angle γ relative to the bottom surface in order to provide the critical angle for the total reflection. Light Lb which enters at an end portion or a light receiving portion of the pointer 2 may pass the pointer 2 or is scattered in the pointer 2.

Figure 24:
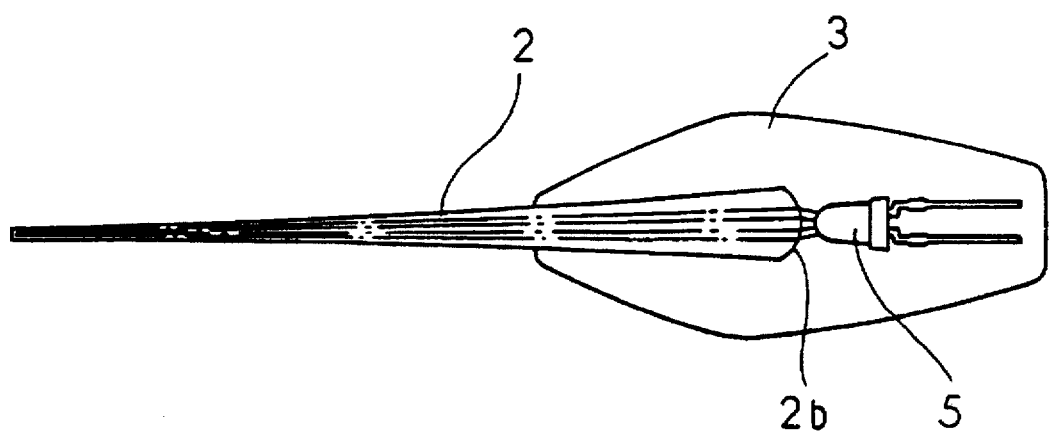
FIG. 24 is a schematic plan view of the indicator according to a seventh embodiment of the present invention.

The pointer 2 according to the seventh embodiment has a convex light receiving surface 2b, and the light emitted from the LED 5 is converged in the pointer 2 as shown in FIG. 24, so that the reflection from the side walls are reduced and high luminance all over the pointer 2 is ensured.

FIG. 28 illustrates a pointer 2 according to a eighth embodiment. The pointer 2 has an upper horizontal surface and the LED 5 is disposed in parallel with the upper surface. A toothed bottom surface 2s ascends with an angle θ with respect to the horizontal upper surface. Since the upper surface of the pointer 2 is flat to the driver, it looks uniformly illuminating in case it is disposed on a black face panel and illuminated by the LED 5. Since the toothed surface 2s is inclined to the LED 5, upward reflection of the light become more effective and high luminance of the pointer 2 may be provided.

FIG. 29 illustrates a pointer 2 according to a ninth embodiment. The pointer 2 has an ascending toothed surface having an inclination angle X with respect to the bottom line (horizontal surface) at its pointed end portion which is connected to a horizontal toothed surface 2s. Other portions are the same as the seventh embodiment. The ascending toothed surface increases the light reflection and uniform luminance of the pointer 2.

FIG. 30 illustrates a pointer according to a tenth embodiment. The pointer 2 has an ascending upper surface, which has an inclination angle Y with respect to the other upper surface, at its pointed end portion in addition to the pointer shown in FIG. 29. The ascending upper surface increases the thickness of the pointed end of the pointer 2 and prevents formation of clear bright and dark stripes due to light reflection from the toothed surface.

FIG. 31 illustrates a pointer according to a eleventh embodiment. The pointer 2 has an ascending upper surface having an inclination angle Z with respect to other upper surface at its pointed end portion in addition to the pointer according to the seventh embodiment. This pointer has almost the same function as the pointer according to the tenth embodiment.

Figure 32:
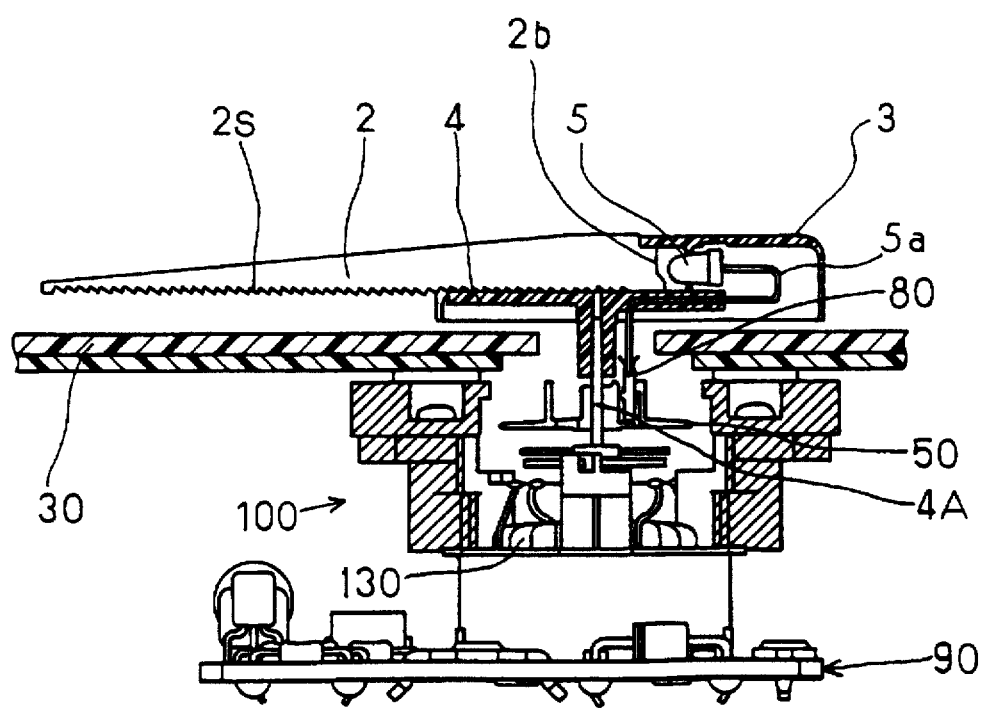
FIG. 32 is a cross-sectional view illustrating an overall structure of an indicating instrument according to a twelfth embodiment of the present invention.

FIG. 32 illustrates an indicating instrument according to an eleventh embodiment. Leads 5a are bent and formed into a U-shape, one of which extends to a terminal 80. This feature reduces the number of parts and manufacturing cost.

The triangles formed in the toothed surface of the pointers 2 according to the previous embodiments are all the same. However, the base (line M between adjacent two bottom portions 2a1 shown in FIG. 22) of the triangle may be increased as it approaches the LED 5 and decreased as it approaches the pointed end of the pointer 2. Likewise, the height of the triangle may be decreased as it approaches the LED 5 and increased as it approaches to the point end of the pointer 2. The above triangles may be gradually changed from the portion close to the LED to the point end of the pointer 2.

Thus, the light entering at the light receiving surface 2b can reach the pointed end of the pointer easily, and the reflection efficiency is increased, resulting in high luminance of the pointer 2.

In case matted or frosted portion is provided on an upper surface of the pointer in the above embodiments, uniform luminance over the pointer can be expected.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An indicating instrument including an internal driving unit with a driving shaft, an indicator, a light emitting element with leads and an electric source, wherein said indicator comprises:

a light conductive pointer having a light receiving portion and an illuminating surface;

a fixture, having a center of rotation connected to said driving shaft, for securing said light receiving portion of said pointer adjacent to said light emitting element;

a cap-shaped cover disposed on said fixture for holding said pointer and said light emitting element in a space formed between said cover and said fixture in place; and a connecting member for connecting said light emitting element and said electric source;

wherein said fixture comprises a balancing weight at a portion opposite said light emitting element with respect to said center of rotation.

2. An indicating instrument claimed in claim 1 wherein said cap-shaped cover has a slit extending from an outer periphery so that said illuminating surface of said pointer is visible to a driver.

3. An indicating instrument claimed in claim 2, wherein said slit extends from said outer periphery to a portion above said center of rotation.

4. An indicating instrument claimed in claim 1, wherein said connecting member has a flat portion which is longer than said light emitting element and disposed on said fixture in parallel with an axis of said light emitting element.

5. An indicating instrument claimed in claim 4, wherein said connecting member comprises terminal members extending close to said leads of said light emitting element so that said leads are connected to said terminal members without bending.

6. An indicating instrument claimed in claim 1, wherein said flat portion of said connecting member comprises a conductive plate molded integrally with said fixture.

7. An indicating instrument claimed in claim 6, wherein said connecting member comprises a plurality of terminal members made of a same sheet of material.

8. An indicating instrument claimed in claim 1, wherein said connecting member comprises terminal members extending close to said leads of said light emitting element so that said leads are connected to said terminal members without bending.

9. An indicating instrument claimed in claim 1, wherein said cap-shaped cover and said fixture in combination comprises ribs for securing said light emitting element.

10. An indicating instrument claimed in claim 9, wherein said cap-shaped cover and said fixture in combination comprises member for providing a small clearance between said ribs and said light emitting element.

11. An indicating instrument claimed in claim 10, wherein said cap-shaped cover and said fixture in combination comprises a cushion member disposed in said small clearance.

12. An indicating instrument claimed in claim 1, wherein said light receiving portion of said pointer comprises a concave light receiving surface at least an upper portion thereof.

13. An indicating instrument claimed in claim 12, wherein said concave light receiving surface comprises a hemispheric surface having its center disposed at a portion where light of said light emitting element is emitted.

14. An indicating instrument claimed in claim 12, wherein said concave light receiving surface comprises a vertically cylindrical surface.

15. An indicating instrument claimed in claim 1, wherein said light receiving portion of said pointer comprises a horizontally convex light receiving surface at least at an upper portion thereof.

16. An indicating instrument claimed in claim 15, wherein said concave light receiving surface comprises a horizontally cylindrical surface.

17. An indicating instrument claimed in claim 1, wherein said light receiving portion of said pointer comprises a horizontally convex surface and a vertically concave surface.

18. An indicating instrument claimed in claim 1, wherein said pointer comprises a toothed bottom surface having first reflecting surfaces facing said light receiving portion and second reflecting surfaces facing said pointed end.

19. An indicating instrument claimed in claim 18, wherein said first reflecting surfaces have an inclination angle with respect to an axis of said light emitting element smaller than that of said second reflecting surfaces.

20. An indicating instrument claimed in claim 18, wherein said toothed bottom surface is disposed in parallel with an axis of said light emitting element.

21. An indicating instrument claimed in claim 18, wherein said inclination angle of said second reflecting surfaces are approximately perpendicular to said axis of said light emitting element.

22. An indicating instrument claimed in claim 1, wherein said pointer comprises a matted portion at said upper surface.

23. An indicating instrument claimed in claim 1, wherein said pointer comprises a colored portion at a bottom portion.

24. An indicating instrument claimed in claim 1, wherein said light emitting element comprises a light emitting diode.

25. An indicating instrument for use in a vehicle instrument panel including an internal driving unit for driving an indicator in response to a vehicle information, a light emitting element with leads and an electric source, wherein said indicator comprises:

a light conductive pointer having an illuminating surface and a light receiving portion;

a casing, having a center of rotation connected to said internal driving unit and a slit exposing said illuminating surface to the outside, for securing said light receiving portion of said pointer to a portion above said center of rotation and said light emitting element in an optical alignment to said light receiving portion; and a connecting member for connecting said light emitting element and said electric source, wherein said casing further comprises a balancing weight disposed at a portion opposite said light emitting element with respect to said center of rotation.

26. An indicating instrument claimed in claim 25, wherein said light conductive pointer comprises a toothed bottom surface.

27. An indicating instrument claimed in claim 26, wherein said light conductive pointer comprises a matted portion at said illuminating surface.

28. An indicating instrument including an internal driving unit with a driving shaft, an indicator, a light emitting element with leads and an electric source, wherein said indicator comprises:

a light conductive pointer having a pointed end, a light receiving portion and an illuminating surface;

a fixture, having a center of rotation connected to said driving shaft, for securing said light receiving portion of said pointer to a portion above said center of rotation and said light emitting element adjacent to said light receiving portion;

a cap-shaped cover disposed on said fixture for holding said pointer and said light emitting element in a space formed between said cover and said fixture in place, said cover having a slit extending from an outer periphery to a portion above said center of rotation so that said illuminating surface of said pointer is visible to a driver; and a connecting member for connecting said light emitting element and said electric source, said connecting member having a flat portion which is longer than said light emitting element and disposed on said fixture in parallel with an axis of said light emitting element, wherein said fixture comprises a balancing weight at a portion opposite said light emitting element with respect to said center of rotation.

29. An indicating instrument including an internal driving unit with a driving shaft, an indicator, a light emitting element with leads and an electric source, wherein said indicator comprises:

a light conductive pointer having a light receiving portion and an illuminating surface;

a fixture, having a center of rotation connected to said driving shaft, for securing said light receiving portion of said pointer adjacent to said light emitting element;

a cap-shaped cover disposed on said fixture for holding said pointer in a space formed between said cover and said fixture in place; and a connecting member for connecting said light emitting element and said electric source;

wherein said fixture comprises a balancing weight at a portion opposite said light emitting element with respect to said center of rotation.

30. An indicating instrument claimed in claim 29 wherein said cap-shaped cover has a slit extending from an outer periphery so that said illuminating surface of said pointer is visible to a driver.

31. An indicating instrument claimed in claim 30, wherein said slit extends from said outer periphery to a portion above said center of rotation.

32. An indicating instrument claimed in claim 29, wherein said connecting member has a flat portion which is longer than said light emitting element and disposed on said fixture in parallel with an axis of said light emitting element.

33. An indicating instrument claimed in claim 32, wherein said connecting member comprises terminal members extending close to said leads of said light emitting element so that said leads are connected to said terminal members without bending.

34. An indicating instrument claimed in claim 29, wherein said light emitting element is mounted on said fixture.

* * * * *